United States Patent Office 3,225,000
Patented Dec. 21, 1965

3,225,000
STABILIZATION OF ACROLEIN POLYMERS
WITH SECONDARY AMINES
Frank J. Welch, Charleston, W. Va., assignor to Union
Carbide Corporation, a corporation of New York
No Drawing. Filed June 9, 1961, Ser. No. 115,925
4 Claims. (Cl. 260—45.8)

This invention relates to compositions containing polyacrolein. More particularly, this invention relates to solid acrolein polymers that are stabilized against oxidation.

In general, acrolein polymers are produced at 0 to about 60° C. in aqueous or non-aqueous media employing free-radical catalysts. These polymers are useful as chemical intermediates. They also can be used as cross-linking agents for poly(vinyl alcohol) and alkyd resins and as leather tanning agents.

Prior to this invention, however, the use of acrolein polymers was limited because the polymers are readily oxidized in air at ambient temperature and degraded in molecular weight.

It has now been discovered that acrolein polymers, and polyacrolein in particular, can be stabilized against oxidative degradation by the addition thereto of certain organic amines.

In general, the amines that can be employed as stabilizers for acrolein polymers are those solid or liquid organic amines which have vapor pressures of less than 1 millimeter of mercury at 30° C.

The organic amines which can be used as stabilizers according to this invention fall within the scope of the following formula:

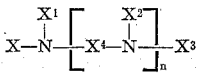

wherein each X, $X^1$, $X^2$, and $X^3$ can be a hydrogen atom, or an alkyl radical having from about 1 to about 18 carbon atoms, or an aryl radical having from about 6 to about 18 carbon atoms; $X^4$ can be a divalent alkylene radical having from about 1 to about 10 carbon atoms or a divalent arylene radical having from about 6 to about 10 carbon atoms; and $n$ is an integer having a value of from 0 to about 5.

As employed throughout this application, the term "alkyl radical" includes hydroxy- and aryl-substituted alkyl radicals, such as hydroxymethyl, hydroxyethyl, benzyl, naphthylmethyl, phenethyl, and the like; the term "aryl radical" includes lower alkyl- and lower alkoxy-substituted aryl radicals, such as tolyl, xylyl, mesityl, ethylphenyl, propylphenyl, butylphenyl, methoxyphenyl, propoxyphenyl, and the like; and the term "arylene radical" includes lower alkyl-substituted arylene radicals, such as tolylene, xylylene, tetramethylphenylene and the like.

As will be seen, amines that are suitable to stabilize acrolein polymers include primary, secondary, and tertiary monoamines and polyamines.

Preferred amines are further represented by formulae A, B, C and D below.

The primary amines that can be employed as stabilizers for acrolein polymers can be represented by the formula:

(A)

wherein R can be an alkyl radical having from 10 to 18 carbon atoms, such as decyl, undecyl, dodecyl, stearyl, and the like or an aryl radical having from 10 to 18 carbon atoms, such as naphthyl, anthracyl, p-butylphen-yl, and the like. Examples of such primary amines include decylamine, dodecylamine, stearylamine, 1-naphthylamine, 2-naphthylamine, p-butylaniline, 2-methyl-1-naphthylamine, and the like.

Secondary amines that can be employed as stabilizers for acrolein polymers can be represented by the formula:

(B)

wherein each $R^1$ and $R^2$ can be an alkyl radical having from about 1 to about 18 carbon atoms, such as hexyl, 2-ethylhexyl, octyl, dodecyl, stearyl, and the like, or an aryl radical, having from 6 to about 18 carbon atoms. Among the secondary amines that are useful as stabilizers for acrolein polymers one can mention dihexylamine, diheptylamine, dioctylamine, diethanolamine, ethylethanolamine, methylethanolamine, isopropylisopropanolamine, butylethanolamine, bis(1-isobutyl-3,5-dimethylhexyl)amine, dibenzylamine, di(naphthylmethyl)amine, diphenethylamine, diphenylamine, dinaphthylamine, dixylylamine, ditolylamine, di(p-methoxyphenyl)amine, di(p-ethoxyphenyl)amine, hexylphenylamine, phenylethanolamine, o-tolylethanolamine, N-ethyl-alpha-methylbenzylamine, N-(2-ethylhexyl)aniline, N-ethylaniline, N-butylaniline, alpha-methylbenzylethanolamine, and the like. Particularly preferred secondary amines are those having at least 10 carbons.

Tertiary amines that can be employed as stabilizers for acrolein polymers can be represented by the formula:

(C)

wherein each $R^3$, $R^4$, and $R^5$ can be an alkyl radical having from about 1 to about 18 carbon atoms, such as methyl, ethyl, propyl, butyl, octyl, stearyl, and the like or an aryl radical having from about 6 to about 18 carbon atoms, such as phenyl, naphthyl, anthracyl, and the like. Among the tertiary amines that are useful as stabilizers for acrolein polymers one can mention tributylamine, trioctylamine, N,N-dimethyl-2-ethylhexylamine, triethanolamine, triisopropanolamine, N-isopropyldiisopropanolamine, N-ethyldiisopropanolamine, N-methyldiethanolamine, N-ethyldiethanolamine, diisopropylethanolamine, di-(2-ethylhexyl)ethanolamine, dibutylisopropanolamine, dibutylethanolamine, N-butyldiethanolamine, tribenzylamine, tri(naphthylmethyl)amine, N,N-dimethyl-alpha-methylbenzylamine, N,N-dimethyl-alpha-methylbenzyldiethanolamine, alpha-methylbenzyldimethylamine, triphenylamine, trinaphthylamine, phenyldinaphthylamine, tritolyamine, trimesitylamine, tri(p-methoxyphenyl)amine, tri(p-ethoxyphenyl)amine, m-tolyldiethanolamine, o-tolyldiethanolamine, methylphenylethanolamine, N,N-dimethylaniline, ethylphenylethanolamine, and the like. Particularly preferred tertiary amines are those having at least 10 carbon atoms.

The polyamines that can be employed as stabilizers for acrolein polymers can be represented by the formula:

(D)

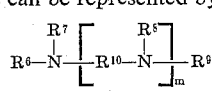

wherein each $R^6$, $R^7$, $R^8$ and $R^9$ can be a hydrogen atom, an alkyl radical having from about 1 to about 18 carbon atoms or an aryl radical having from about 6 to about 18 carbon atoms, $R^{10}$ can be a divalent alkylene radical having from about 1 to about 10 carbon atoms, such as methylene, ethylene, trimethylene, tetramethylene, pentamethylene, hexamethylene, and the like, or a divalent arylene radical having from about 6 to about 10 carbon atoms, such as phenylene, 1,4-naphthylene, tolylene, xylylene, and the like; and m is an integer having a value of from 1 to about 5. As examples of polyamines that can be employed as stabilizers for acrolein polymers one can mention p-phenylenediamine, N,N'-diphenyl-6-phenylenediamine, 2-amino-ethylethanolamine, N-(2-hydroxyethyl)propylenediamine, N,N'-di(alpha - methylbenzyl)ethylenediamine, N-(2-hydroxyethylaminoethyl)ethanolamine, diethylenetriamine, N,N-bis(3-aminopropyl)methylamine, triethylenetetramine, tetraethylenepentamine, pentaethylenehexamine, dipropylenetriamine, 3',3 - diaminodipropylamine, and the like.

In addition to the amines related above, certain heterocyclic secondary amines can be employed as stabilizers for acrolein polymers. These heterocyclic amines can be represented by the formula:

(E) 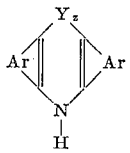

wherein z is a number having a value of 0 or 1; Y can be a divalent methylene group, a secondary amino group, a sulfur atom, or an oxygen atom; and Ar is the residue of a fused aromatic moiety, such as the benzene moiety, the naphthalene moiety, the phenanthrene moiety, the anthracene moiety, and the like. As examples of such heterocyclic amine compounds which are suitable as stabilizers, one can mention carbazole, acridan, phenoxazine, phenothiazine, 2,3-benzocarbazole, alpha-benzocarbazole, 3,4-benzocarbazole, 12 H-5-oxa-12-azanaphthacene, gamma-benzophenoxazine, 1,2-benzophenoxazine, 12 H-5-thia-12-azanaphthacene, 1,2-benzophenothiazine, 3,4-benzophenothiazine, and the like.

Most preferred as stabilizers for acrolein polymers are aromatic secondary amines, such as diphenylamine, di-p-methoxyphenylamine, di-1-naphthylamine, di-2-naphthylamine, phenyl-1-naphthylamine, phenyl-2-naphthylamine, N,N'-diphenyl-p-phenylene diamine, and the like; and the heterocyclic amines containing a fused aromatic moiety, as defined above.

The stabilizers employed in the compositions of this invention are added to the acrolein polymer to be stabilized by procedures well known in the art; for example, by admixing said stabilizer with the polymer or by coating said stabilizer on the polyacrolein.

A preferred method of applying the stabilizer to the acrolein polymers is to contact the polymer with a solution of the stabilizer in a solvent for the stabilizer and then evaporating off the solvent, whereby the polymer particles are coated with the stabilizer. This process is preferably conducted during the recovery of the acrolein polymer from the polymerization reaction, wherein the freshly produced acrolein polymer is subjected to a final washing with a solution of the stabilizer and then dried.

Suitable solvents for the application of the stabilizers to the acrolein polymers are normally liquid media which are solvents for the amine but do not adversely affect the acrolein polymer. It is preferred that the solvent that is employed is one which is readily removed at room temperature. Applicable solvents are, for example, water, benzene, toluene, n-pentane, isopentane, n-hexane, isohexane, cyclohexane, cyclopentane, carbon tetrachloride, dichloroethane, methanol, isopropyl alcohol, acetone, methyl ethyl ketone, methyl isopropyl ketone, diisopropyl ether, methyl acetate, methyl propionate, ethyl acetate, ethyl formate, and the like, and mixtures thereof.

Acrolein polymers also can be stabilized by dry blending the polymer and the amine stabilizer by suitable methods, such as by grinding the acrolein polymer and the amine stabilizer together in a mill. For most purposes, however, the above-described solvent-evaporation procedure is the preferred method for incorporating the stabilizer with the acrolein polymer.

The amount of stabilizer employed can be varied from 0.001 to about 5.0 weight percent or more of stabilizer, based upon the weight of acrolein polymer, with from about 0.01 to about 1.0 weight percent of stabilizer, based on the weight of acrolein polymer, preferred.

The following examples are illustrative:

EXAMPLE I

A 5.0 gram sample of polyacrolein powder was placed in a 14-cm. diameter Petri dish, 20 milliliters of an acetone solution containing 0.010 gram of phenyl-2-naphthyl amine was added and the mixture was stirred. The acetone was then evaporated from the resulting mixture at room temperature and the dish containing the polyacrolein stabilized with about 0.2 weight percent of phenyl-2-naphthylamine, based upon the weight of polyacrolein, was placed in a circulating air oven at 140° F. for ageing tests. Reduced viscosities of the stabilized polyacrolein were determined with samples taken before ageing and after 1, 2, and 3 weeks of ageing. The determinations were conducted at 30° C., employing a solution of 0.2 gram of stabilized polyacrolein in 100 milliliters of a saturated solution of sulfur dioxide in water. The reduced viscosities of samples of unstabilized polyacrolein were also determined before and after ageing under the same conditions for purposes of comparison.

Employing procedures similar to those described above, several other amines were tested as stabilizers for polyacrolein. The results of these experiments are set forth in Table A below. The amines used as stabilizers were:

(1) Phenyl-2-naphthylamine
(2) Diphenylamine
(3) N,N'-diphenyl-p-phenylenediamine
(4) Carbazole
(5) Phenothiazine
(6) A mixture containing
    (a) 50% of phenyl-2-naphthylamine
    (b) 25% of N,N'-diphenyl-p-phenylenediamine
    (c) 25% of di-p-methoxyphenylamine
(7) Dodecylamine
(8) Dibenzylamine
(9) Di-2-ethylhexylamine
(10) Triethanolamine

*Table A*

| Amine | Reduced Viscosity | | | |
|---|---|---|---|---|
| | Initial | After Ageing at 140° F. | | |
| | | 1 week | 2 weeks | 3 weeks |
| 1 | 4.0 | 3.7 | 3.1 | 2.4 |
| 2 | 3.7 | | 3.3 | 3.2 |
| 3 | 3.7 | 3.5 | 3.2 | 3.2 |
| 4 | 3.7 | 2.4 | 2.1 | 1.7 |
| 5 | 4.0 | 4.5 | 3.7 | 4.0 |
| 6 | 4.0 | 4.3 | 4.2 | 3.9 |
| 7 | 3.7 | 2.3 | 1.8 | 1.6 |
| 8 | 3.7 | 2.5 | 2.1 | 1.9 |
| 9 | 3.7 | 2.4 | 1.7 | |
| 10 | 3.7 | 2.4 | 2.4 | 1.5 |
| None | 4.0 | 1.3 | 0.8 | 0.5 |

From Table A it can be seen that all the amine stabilizers tested greatly retarded the oxidative degradation of polyacrolein, whereas the untreated polyacrolein was badly degraded within 2 weeks, and was more severely degraded after 1 week of ageing than were any of the stabilized samples after 3 weeks of ageing. Phenothiazine (No. 5) and a mixture of phenyl-2-naphthylamine, N,N'-diphenyl-p-phenylenediamine and di-p-methoxyphenylamine (No. 6) were the most effective of this group in stabilizing polyacrolein against oxidation, for little or no degradation of the polyacrolein treated with these compositions was observed even after 3 weeks ageing.

EXAMPLE II

A 5.0-gram sample of polyacrolein containing 0.5 weight percent of phenothiazine as a stabilizer was prepared according to the procedure described in Example I. The stabilized polyacrolein and an unstabilized sample of polyacrolein were placed in a circulating air oven at 257° F. The reduced viscosities of the stabilized and unstabilized polyacrolein were determined at the end of 0, 15, 35, 90, 150, and 270 minutes according to the procedure of Example I. The results are set forth in Table B below:

*Table B*

| Minutes in Air at 257° F. | Reduced Viscosity | |
|---|---|---|
| | Unstabilized Polyacrolein | Stabilized Polyacrolein |
| 0 | 4.2 | 4.2 |
| 15 | 3.2 | 4.4 |
| 35 | 1.2 | 4.2 |
| 90 | Insoluble | 2.7 |
| 150 | Insoluble | 1.9 |
| 270 | Insoluble | 1.9 |

From Table B it can be seen that the polyacrolein stabilized with phenothiazine was much more resistant to oxidation than was the unstabilized polyacrolein. The unstabilized polyacrolein discolored badly after 90 minutes at 257° F. and crosslinked, as indicated by the insolubility of the polyacrolein in the sulfur dioxide-water solution. On the other hand, the phenothiazine-stabilized polyacrolein was unaffected for over one-half hour at 257° F., and was only slightly discolored after about 3 hours at 257° F., at which time it had shown less degradation than that which occurred on the unstabilized polymer in a half hour.

What is claimed is:
1. The stabilized composition of polyacrolein, and diphenylamine in an amount sufficient to stabilize said polyacrolein against oxidation.
2. The stabilized composition of polyacrolein, and N,N'-diphenyl-p-phenylenediamine in an amount sufficient to stabilize said polyacrolein against oxidation.
3. The stabilized composition of polyacrolein, and phenothiazine in an amount sufficient to stabilize said polyacrolein against oxidation.
4. The stabilized composition of polyacrolein and a mixture consisting of 50 weight percent of phenyl-2-naphthylamine, 25 weight percent of N,N'-diphenyl-p-phenylenediamine, and 25 weight percent of di-p-methoxyphenylamine, said mixture being present in an amount sufficient to stabilize said polyacrolein against oxidation.

References Cited by the Examiner

UNITED STATES PATENTS

| 2,212,894 | 8/1940 | Allen | 260—67 |
| 2,396,556 | 3/1946 | Cox | 260—45.8 |
| 2,396,557 | 3/1946 | Cox | 260—45.8 |
| 3,014,888 | 12/1961 | Shimmin | 260—45.8 |
| 3,065,200 | 11/1962 | Johansson | 260—45.9 |
| 3,121,700 | 2/1964 | Bergman | 260—67 |

FOREIGN PATENTS

| 1,059,661 | 6/1959 | Germany. |
| 1,081,231 | 5/1960 | Germany. |
| 855,889 | 12/1960 | Great Britain. |

LEON J. BERCOVITZ, *Primary Examiner.*

M. STERMAN, *Examiner.*